UNITED STATES PATENT OFFICE.

HORACE FOSTER SOLLIDAY, OF CHICAGO, ILLINOIS, ASSIGNOR OF ONE-HALF TO WILLIAM COWAN, OF WOODSTOCK, ILLINOIS.

BREAD-MAKING COMPOUND.

No. 828,251.　　　　　Specification of Letters Patent.　　　　Patented Aug. 7, 1906.

Application filed May 4, 1904. Serial No. 206,308.

*To all whom it may concern:*

Be it known that I, HORACE FOSTER SOLLIDAY, a citizen of the United States, residing at Chicago, in the county of Cook and State of Illinois, have invented a new and useful Improvement in Bread-Making Compounds, of which the following is a specification.

This invention relates to a compound for use in the making of bread, and has for its objects to increase the nutritive properties of the bread; to furnish a compound either in the form of a liquid, solid, or semisolid which can be added to the flour or meal without deleterious effects; to prepare a compound of harmless ingredients which when added to the bread material, imparts a superior quality to the bread, and to prepare a compound which can be furnished to bakers and used by bakers in making bread.

The invention consists in the compound prepared from the ingredients, as hereinafter described, and pointed out in the claims.

The compound consists of whey, sugar or saccaharine, and other harmless preservative and a filler or thickener of a cereal product, which ingredients are brought together in the form of a liquid, preferably of the consistency of pasty or semisolid condition or, if desired, reduced to a powder or other solid.

A formula for making the compound in the condition of a liquid or paste is as follows: One thousand (1,000) pounds of whey, which is to be reduced by evaporation to, say, one-fifth of its bulk or body, thirty-two (32) pounds of standard sugar or any equivalent of the sugar or in place thereof one ounce of saccharine as a sweetening for the thousand pounds of whey, one ounce of harmless preservative, though where the compound is for immediate use the preservative of course can be omitted, and a filler—such as flour, starch, or other cereal product suitable for the purpose—varying in amount from two and a half (2½) to five (5) pounds, according to the degree of thickening required. The whey and other ingredients can be evaporated by boiling or otherwise to a consistency of paste of a thick nature, the evaporation continuing, preferably, until the reduction has reached one-fifth (⅕) of the body, though the amount of reduction can be varied to a greater or less degree than one-fifth without impairing the compound for use.

While it is preferred to have the compound for use in the condition or consistency of a paste or thickened mass, the whey and other ingredients can have the evaporation continued until it is in a solidified state and can be reduced to a powder or formed into cakes, and when in the form of powder or cakes, which is convenient and well adapted for shipment, the compound for use in the making of bread is to be restored to a paste or thickened mass by the addition to the cake or powder of the necessary quantity of water or milk.

For use in the making of bread a quart of the standard compound in the form of a paste or thickened mass is added to one pail or three gallons of water in mixing the dough, and the dough is to be mixed and kneaded in any usual and well-known manner of making dough. It is well known that with the casein removed the whey still retains a large proportion of lactic acid and also a large proportion of the sugar of milk, and these elements are of high nutritive quality. It is the benefit of this high nutritive quality of whey that is utilized in making bread from the compound of the present invention, as such nutritive quality is carried into the dough and adds its percentage to the percentage of nutrition of the flour when made into bread.

The compound is of a moist nature, and bread containing the compound will retain its moisture and remain in a moist condition and fresh, with all of the nutrient properties retained therein, for a much longer period of time than bread made in the ordinary way.

It will be seen that in making bread with the compound of the present invention two important advantages are obtained—namely, an addition of nutritive property derived from the lactic acid and sugar of milk of the whey and the keeping of the bread in a moist and fresh condition for a long period of time—which advantages are derived solely from the compound.

The proportions stated and the ingredients named are preferred; but it is to be understood that the proportions can be varied without destroying the effectiveness derived from the use of the whey in the compound, and any sweetener which can be compounded thoroughly with the whey and any harmless preservative can be employed without changing the effectiveness of the whey in adding nutrition to the bread and keeping the bread moist and fresh.

It will be understood that the consistency of the compound in its pasty condition can be varied to suit the requirements of use, such condition being dependent on the reduction by evaporation of the bulk or body of the whey, which preferably is a reduction to one-fifth, (1/5,) but can be reduced to a greater or less degree, and when reduced to a dry or powdered condition the restoration for use by water or milk should be such as to make the compound a paste, more or less thick in its nature, before adding to the bread material.

What I regard as new, and desire to secure by Letters Patent, is—

1. A compound for increasing the nutritive properties of bread, consisting essentially of evaporated whey having added thereto a sweetening agent, and a binding agent, the whole being soluble in water or milk and adapted to be mixed with flour in the making of bread, substantially as described.

2. A compound for increasing the nutritive properties of bread, consisting of whey evaporated to substantially one-fifth of its original bulk having added thereto a sweetening agent, and a binding agent, the compound being soluble in water or milk and adapted to be added to flour in the making of bread, substantially as described.

3. A compound for increasing the nutritive properties of bread, consisting of the following ingredients in substantially the proportions named: one thousand pounds of whey reduced by evaporation to substantially one-fifth of its bulk or body, thirty-two pounds of sugar, and a thickening agent adapted to give to the compound the proper consistency, the whole being evaporated to the consistency of paste and adapted to be dissolved in water or milk and mixed with flour in the making of bread, substantially as described.

HORACE FOSTER SOLLIDAY.

Witnesses:
    THOMAS A. BANNING,
    PAULINE BECKMAN.